(12) United States Patent
Divringi et al.

(10) Patent No.: US 10,133,824 B2
(45) Date of Patent: Nov. 20, 2018

(54) SYSTEMS, METHODS, AND APPARATUSES FOR ASSOCIATING FLEXIBLE INTERNET BASED INFORMATION WITH PHYSICAL OBJECTS

(71) Applicant: DYNOTAG, INC., Seattle, WA (US)

(72) Inventors: Murat Divringi, Bellevue, WA (US); Ozan Eren Bilgen, Berkeley, CA (US)

(73) Assignee: DYNOTAG, INC., Seattle, WA (US)

( * ) Notice: Subject to any disclaimer, the term of this patent is extended or adjusted under 35 U.S.C. 154(b) by 45 days.

(21) Appl. No.: 15/346,614

(22) Filed: Nov. 8, 2016

(65) Prior Publication Data

US 2017/0053035 A1 Feb. 23, 2017

Related U.S. Application Data

(62) Division of application No. 14/820,322, filed on Aug. 6, 2015, now Pat. No. 9,519,809, which is a division
(Continued)

(51) Int. Cl.
*G06F 17/30* (2006.01)
*H04L 29/06* (2006.01)
(Continued)

(52) U.S. Cl.
CPC .. *G06F 17/30879* (2013.01); *G06F 17/30876* (2013.01); *G06F 17/30887* (2013.01); *G06K 1/12* (2013.01); *G06K 1/121* (2013.01); *G06K 19/06037* (2013.01); *G06Q 30/02* (2013.01); *H04L 63/0853* (2013.01)

(58) Field of Classification Search
CPC .......... G06F 17/30; G06F 17/30861–17/30879
See application file for complete search history.

(56) References Cited

U.S. PATENT DOCUMENTS

| 6,199,048 B1 | 3/2001 | Hudetz et al. |
| 8,131,597 B2 | 3/2012 | Hudetz et al. |
| 8,533,857 B2 | 9/2013 | Tuchman et al. |

(Continued)

FOREIGN PATENT DOCUMENTS

| JP | 2007-109048 A | 4/2007 |
| JP | 2007-328552 A | 12/2007 |

(Continued)

OTHER PUBLICATIONS

International Search Report and Written Opinion for International Application No. PCT/US2012/059106 dated Mar. 15, 2013.

*Primary Examiner* — Christle I Marshall
(74) *Attorney, Agent, or Firm* — Dorsey & Whitney LLP

(57) ABSTRACT

Systems, apparatuses and methods for associating flexible Internet based information with physical objects is described. An example system includes a database server configured to generate a tag responsive to receiving a request from a requesting device. The tag is encoded with a uniform resource locator. The database server is further configured to associate a tag type of a plurality of tag types with the tag. The tag type indicates an intended use of the tag. The system further includes a memory configured to store data corresponding to the tag. The data may include the uniform resource locator and the tag type.

13 Claims, 5 Drawing Sheets

Related U.S. Application Data of application No. 14/343,377, filed as application No. PCT/US2012/059106 on Oct. 5, 2012, now Pat. No. 9,158,944.

(60) Provisional application No. 61/544,792, filed on Oct. 7, 2011.

(51) Int. Cl.
    *G06Q 30/02*     (2012.01)
    *G06K 1/12*     (2006.01)
    *G06K 19/06*     (2006.01)

(56) References Cited

U.S. PATENT DOCUMENTS

| | | |
|---|---|---|
| 8,973,813 B2 | 3/2015 | Penny et al. |
| 9,158,944 B2 | 10/2015 | Divringi et al. |
| 2009/0031071 A1 | 1/2009 | Chiu |
| 2009/0108057 A1 | 4/2009 | Mu et al. |
| 2009/0146782 A1 | 6/2009 | Cordes |
| 2009/0287674 A1* | 11/2009 | Bouillet ............ G06F 17/30884 |
| 2011/0000958 A1 | 1/2011 | Herzig |
| 2012/0016863 A1* | 1/2012 | Bernhardt ......... G06F 17/30705 |
| | | 707/710 |
| 2012/0036226 A1 | 2/2012 | Chor |
| 2014/0110468 A1 | 4/2014 | Kandregula |
| 2014/0263677 A1 | 9/2014 | Divringi et al. |
| 2015/0347888 A1 | 12/2015 | Divringi et al. |

FOREIGN PATENT DOCUMENTS

| | | |
|---|---|---|
| KR | 10-2009-0067768 A | 6/2009 |
| KR | 10-1048644 B1 | 7/2011 |

* cited by examiner

SYSTEMS, METHODS, AND APPARATUSES FOR ASSOCIATING FLEXIBLE INTERNET BASED INFORMATION WITH PHYSICAL OBJECTS

CROSS-REFERENCE TO RELATED APPLICATION(S)

This application is a divisional of U.S. patent application Ser. No. 14/820,322, filed Aug. 6, 2015, and issued as U.S. Pat. No. 9,519,809 on Dec. 13, 2016, which is a divisional of U.S. patent application Ser. No. 14/343,377, filed Mar. 6, 2014, and issued as U.S. Pat. No. 9,158,944 on Oct. 13, 2015, which application is a 371 National Stage filing of International Application No. PCT/US2012/059106, filed Oct. 5, 2012, which application claims the benefit of U.S. Provisional Application No. 61/544,792, filed Oct. 7, 2011. The aforementioned applications and patents are incorporated herein by reference in their entirety, for any purpose.

TECHNICAL FIELD

Embodiments of the invention relate generally to systems for providing information associated with QR codes or other passive tags, and one or more described embodiments include creating and publishing sets of tags that may be gateways to "tiny private website" content accessible on the Internet. Some examples include methods for retail offering of merchandise with such tags.

BACKGROUND

A variety of tags, e.g. quick response (QR) codes, are available to point to Internet or other online content. However, existing tags typically point to a particular online location created for a specific purpose. Services providing the online content typically provide a single type and format of information to be accessed at the location pointed to by the tag, e.g. QR code. A QR code may encode specific information in the QR code, e.g. a website address or other online location. The specific information may be retrieved by scanning e.g. taking a picture of) the QR code. The specific information encoded in the QR code can be used to retrieve additional information related to the QR code, however that additional information accessible at the location is typically in a specific format and type dictated by the provider of the online location.

SUMMARY

Examples of systems, apparatuses and methods for associating flexible Internet based information with physical objects is described. According to one embodiment, a system includes a server and a memory. The server may be configured to generate a tag responsive to receiving a request from a requesting device. The tag may be encoded with a uniform resource locator. The server may be further configured to associate a tag type of a plurality of smart tag types with the tag. The tag type may indicate an intended use of the tag. The server may be further configured to change the tag type based on receiving a type change request from the requesting device. The server may be coupled to a network, and the request may be received via the network. The server may be further configured to associate tag data with the tag provided by the requesting device. The tag data may correspond to a template associated with the tag type. The memory may be configured to store data corresponding to the tag; the uniform resource locator, and data for retrieval at the uniform resource locator in accordance with the tag type. The memory may include a database that stores the data corresponding to the tag, the uniform resource locator, and the data for retrieval. The memory may further include template storage that includes templates for each of the plurality of tag types.

According to another embodiment, a method may include receiving a registration request to register a tag at a server from a requesting device. The tag may include a two-dimensional encoded image that identities a uniform resource locator. The method may further include sending a selection request for selection of an intended use of the tag from a list containing a plurality of intended uses and receiving a selected intended use of the tag. The method may further include selecting a tag type based on the selected intended use and receiving tag data corresponding to the selected tag type. The method may further include storing a record corresponding to the tag, the record including the uniform resource locator and the tag data. The method may further include, after storing the record, receiving a change request to select a different intended use of the tag, selecting a second tag type based on the different intended use, and updating the record to remove the tag type and add the second tag type. The method may further include generating authentication information corresponding to the tag, and including the authentication information in the record. Generating authentication information may include providing the authentication information to the requesting device. Generating authentication information may include receiving the authentication information from the requesting device.

According to yet another embodiment, a non-transitory computer readable medium that includes computer executable instructions is disclosed. The computer executable instructions, when executed by one or more processing units, may cause the one or more processing units to receive a generation request to generate a tag from a requesting device and generate the tag by encoding a uniform resource locator in a computer readable image. The computer executable instructions, when executed by the one or more processing units, may further cause the one or more processing units to provide the computer readable image to the requesting device and receive an indication of an intended use of the tag. The computer executable instructions, when executed by the one or more processing units, may further cause the one or more processing units to assign a tag type based on the indicated intended use, receive tag data corresponding to the tag type, and store a record corresponding to the tag, the record including the tag type, the tag data, and the uniform resource locator. The computer executable instructions may further include instructions, that, when executed by the one or more processing units, cause the one or more processing units to arrange the tag data according to the tag template; and provide the arranged tag data to the requesting device, the arranged data used by the requesting device to view a site corresponding to the uniform resource locator. The computer executable instructions, when executed by the one or more processing units, may further cause the one or more processing units to arrange the tag data according to the tag template, and provide the arranged tag data to the requesting device. The arranged data used by the requesting device to view a site corresponding to the uniform resource locator. The computer executable instructions, when executed by the one or more processing units, may further cause the one or more processing units to assign viewer authentication information to the tag, and limit access to at least a portion of the arranged data prior to receiving authentication information from the requesting device. The computer executable instructions, when executed by the one or more processing units, may further cause the one or more processing units to update the record to assign a new tag type based on receiving a new indicated use from the requesting device.

According to yet another embodiment, an apparatus including an object and a tag affixed to the object is disclosed. The tag may include an image that includes a quick response code. The quick response code may identify a uniform resource locator corresponding to an Internet site. The Internet site may include data arranged according to a first tag type when the first tag type is associated with the tag, and arranged according to a second tag type when the second tag type is associated with the tag.

DETAILED DESCRIPTION

Certain details are set forth below to provide a sufficient understanding of embodiments of the invention. However, it will be clear to one having skill in the art that embodiments of the invention may be practiced without these particular details. Moreover, the particular embodiments of the present invention described herein are provided by way of example and should not be used to limit the scope of the invention to these particular embodiments.

As discussed above, existing systems employing tags to point to Internet or other online sources of information may be limited in the type and kind of information that may be provided at those locations. For example, one site may be available that serves as a source of retail information (e.g. a name and location of a store from which a user could purchase a tagged item, which may also include a price of the tagged item). However, the site or other online location may be configured to provide only that type of information and it may not be possible for that site or online location to be reconfigured to provide a different type of information, e.g. information about a pet, owned item, etc. In this manner, existing systems may be inflexible.

Embodiments of the present invention may provide tags that point to Internet sites or other online locations which may offer full website functionality (also referred to herein as 'private tiny web sites'). Accordingly, the Internet site or other online location pointed to by a tag may be configured to provide substantially any type or format of information. An entity associated with the tag (e.g. an owner of the tag) may configure the Internet site or other online location pointed to by the tag to present a particular type of information in a particular format, and the type and format of the information may be chanced by that entity. Accordingly, tags may be obtained by an entity without regard to how the Internet site with which they are associated is configured. Instead, at the time of registering or setting up the tag, or in some examples, at any time, the entity associated with the tag may alter the type and format of information available at the Internet site or other online location pointed to by the tag. In some examples, templates are provided for common functions an entity associated with a tag may want to use to provide a more standard type and format of available information (e.g. pet template, luggage template, retail product template, ad template, etc.). An entity associated with the tag may select a template for use in configuring the site or other online location to which the tag points.

Figure 1:
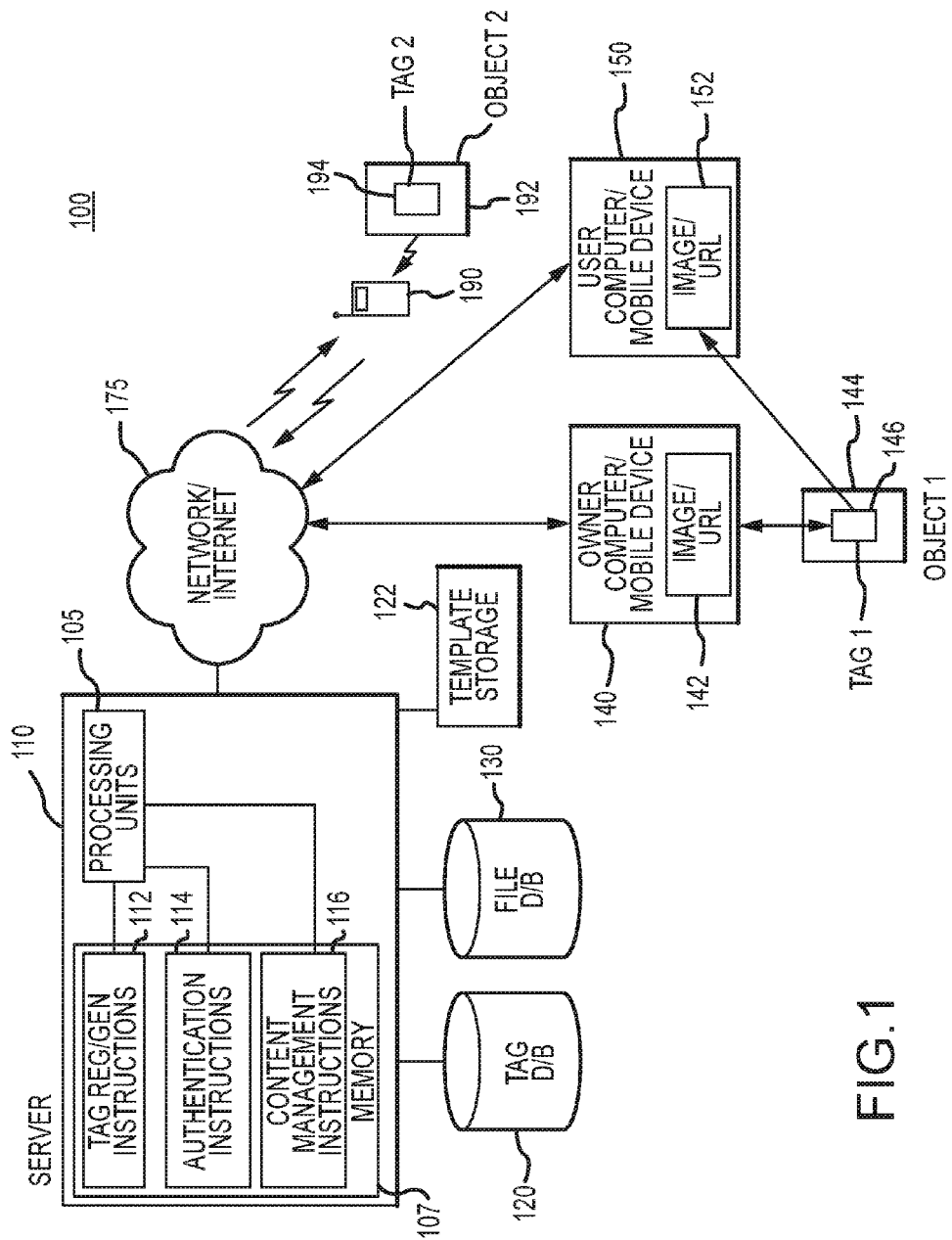
FIG. 1 is a block diagram of a particular illustrative embodiment of a system including a tag access system.

FIG. 1 is a block diagram of a particular illustrative embodiment of a system including a tag access system. The system 100 may provide a configurable, and in some example, reconfigurable Internet site and/or other online location (e.g. a tiny private web site "TPW") for an entity associated with a tag (e.g. an owner of the tag). The system 100 may include a server 110 which may be in electronic communication with a tag database 120 and/or file database 130. The system 100 may further include a plurality of user devices, such as an owner device 140, a user device 150, and/or a mobile device 190. The devices, e.g. 140, 150 may communicate with the server 110 via a network 175 (which may be implemented as the Internet in some examples) to exchange information. The information provided by and the information received at the server 110 may correspond to a respective tag, such as a first tag 146 associated with a first object 144 or a second tag 194 associated with a second object 192. Any number of tags may be supported in examples of the present invention.

Examples of the present invention accordingly include tags, such as the tags, such as the tags 146 and 194 of FIG. 1. The tags may be implemented generally using any 2D or 3D arrangement for encoding information including, but not limited to, QR codes, bar codes, images, and holograms. The tags may be read in any manner suitable to the tag, including but not limited to taking a picture of the tag and scanning the tag. Tags in accordance with embodiments of the present invention generally encode an address for an Internet site or other online location which a user device may be directed to when the tag is read. Examples of systems described herein include systems for providing a configurable, and in some examples reconfigurable, site or other online location for presenting information associated with the tag. In some examples, the encoded information may be a uniform resource locator (URL) or other unique Internet identifier The database server 110 may be implemented using a memory 107 that may be encoded with computer executable instructions that are capable of being executed by one or more processing units 105. The memory 107 may be implemented using any transitory or non-transitory computer readable medium or multiple computer readable media, including but not limited to, hard disks, RAM, ROM, flash, optical storage, or any other electronic storage. The processing unit(s) 105 may be implemented using one or more processor(s) or other circuitry capable of performing the described functions. While shown as a single memory 107 and processing unit(s) 105, it is to be understood that the architecture of the server 110 is quite flexible, and multiple memories may be used to encode the described instructions, and or multiple processing unit(s). The memory and/or processing unit(s) may further be distributed across one or more physical computing devices or locations in some examples. Accordingly, the server 110 may be programmed to perform any or all of the functions described with regard to the instructions encoded on the memory 107.

The computer executable instructions may include tag registration/generation instructions 112, authentication instructions 114, and content management instructions 116.

The tag registration/generation instructions 112 may cause the server 110 (e.g. one or more of the processing unit(s) 105) to facilitate creation or registration of a smart tag, including retrieving data from a tag database 120. The authentication instructions 114 may cause the server 110 (e.g. one or more of the processing units 105) to set up authentication of an owner of a tag to allow the owner to securely access a site or other online location (e.g. TPW) associated with the tag. The content management instructions 116 may cause the server 110 (e.g. one or more of the processing units 105) to facilitate management of sites or other online locations (e.g. TPWs) associated with tags, including retrieving data from a tag database 120 and a file database 130 in some examples.

The mobile device 190 may include a reader (e.g. a camera) which may read (e.g. take a photo of) the second tag 194 of the second object 192, and decode the read data (e.g. photo) to interpret the information encoded by the tag 194. In some examples, the information encoded by the tag 194 is a URL which may point to an Internet site or other online location. In another embodiment, a user may enter the URL of the Internet or other online location associated with the second tag 194 into a browser address bar via a keyboard or other input device (e.g. touchscreen, etc.). Similarly, the owner device 140 and the user device 150 may each include a reader (e.g. a camera) and may read data (e.g. take and decode an image) encoded by the smart tag image/URL 142 and the smart tag image/URL 152, respectively, and decode the image to interpret the URL encoded by the respective tag. Any suitable computing devices may be used to implement the devices 140, 150, and/or 190, including but not limited to, desktop computers, laptop computers, cellular telephones, tablets, and generally any device having sufficient computational capability to perform the actions described herein.

In operation, the database server 110 may receive a request from a requesting device, such as an owner device 140 or an owner/user mobile device 190, to generate a tag. The request may be received over the network 175, which may be wired, wireless, or combinations thereof. The requesting device may be associated with a prospective or actual owner of the tag in some examples. Responsive to receipt of the request, the tag registration/generation instructions 112 may cause the computing system 110 (e.g. the processing units 105) to facilitate generation of a tag encoded with unique identifying information. For example, the tag registration/generation instructions 112 may cause the processing units 105 to associate a TPW with the tag. In an embodiment, the tag registration/generation instructions 112 causes the processing units 105 to assign a URL associated with a TPW to be encoded in an image (e.g. a 2D or 3D image such as, but not limited to, a bar code, QR code, or other image). In another embodiment, the tag registration/generation instructions 112 causes the processing units 105 to prompt the prospective owner via the requesting device to enter a URL or a portion of a URL, and the tag registration/generation instructions 112 causes the processing units 105 to assign the URL received from the requesting device to the tag. The tag registration/generation instructions 112 may cause the processing units 105 to verify whether the URL entered by the owner has already been assigned. For example if the received URL has already been assigned, the tag registration/generation instructions 112 may cause the processing units 105 to prompt the owner to enter another URL or suggest different URLs based on the received URL. The information may be encoded into an image and the image, such as the tag image/URL 142, the tag image/URL 152, or the second tag 194, may be provided to the requesting device. The prospective owner may use the image of the tag to generate one or more physical or electronic tags to be applied to a number of uses, such as printing the tag as a label or electronically pasting the tag into an email signature. The tag registration/generation instructions 112 may cause the processing units 105 to retrieve and/or store URL and owner data at the tag database 120. In an embodiment, the URL encoded in the image may be an altered version of a requested or designated URL in order to improve readability and/or to simplify the encoding necessary to generate the tag. The altered version of the URL may point to the same site or other location as the requested or designated URL. For example, portions of the site name may be shortened or abbreviated when encoded in the tag. For example, the site http://dynotag.com/12345678 may be encoded as dtl.co/12345678. When reading the tag, the server 110 may expand the encoded URL to reach the same site.

In another embodiment, the database server 110 may receive a request to register a tag that has already been generated from a requesting device, such as an owner device 140 or an owner/user mobile device 190. For example, tags associated with and/or affixed to a product may be generated, and a consumer purchasing the product may register the tag to provide access to and/or configure a TPW encoded in the tag. The request may include a URL encoded in the tag and/or an image of the tag or other identifier. The requesting device may receive the URL via an input device (e.g. a keyboard, a scanner, or a camera). The tag registration/generation instructions 112 may cause the server 110 (e.g. processing unit(s) 105) to receive the request to register the tag via a requesting device, and may set up an account associated with the consumer. As an additional layer of security, the tag registration/generation instructions 112 may cause the server 110 (e.g. one or more of the processing units 105) to prompt the consumer via the requesting device to provide an activation code. The activation code may be hidden to prevent use prior to purchasing. The tag registration/generation instructions 112 may cause the server (e.g. one or more of the processing units 105) to retrieve and/or store the activation code and owner data in the tag database 120.

During operation, the authentication instructions 114 may cause the server 110 (e.g. processing units 105) to handle setting up and verifying authentication of an owner prior to providing access to owned content. Each tag may be associated with an owner. The owner may be an individual, a group, another electronic process, or any entity affiliated with the tag and allowed to change content available at the site or other online location encoded by the tag. At a time of generation of a tag or at a time of registration of a tag by the server 110 based on the tag registration/generation instructions 112, the authentication instructions 114 may cause the server 110 to request identifying information of the owner via the requesting device. The authentication instructions 114 may cause the server 110 to store authentication information received from the requesting device at the tag database 120, or other storage location accessible to the server 110. The identifying information may include a username and a password, a pin, or other security feature to prevent access for existing data on the site or other online location from unauthorized users. In an embodiment, the authentication instructions 114 may cause the server 110 to generate an Internet cookie and provide the Internet cookie to the requesting device. When an access request to a tag is received, the authentication instructions 114 may cause the server 110 to check for the Internet cookie or prompt the requestor via the requesting device to supply a username, a password, a pin, or any combination thereof. If authentication information received from the requesting device is insufficient to identify the owner, the requestor may be prevented from viewing/modifying the site or other online location (e.g. tiny private website) encoded by the tag. If the authentication information received from the requesting device matches authentication information associated with the tag, access may be granted to view/modify the site or other online location (e.g. TPW) encoded by the tag.

In operation, the content management instructions 116 may cause the server 110 to manage the site or other online location (e.g. tiny private website) associated with tags enrolled in the system 100 (e.g. stored in the tag database 120). The content management instructions 116 may cause the server 110 to provide support for initially generating (e.g. setting up) a site or other online location (e.g. tiny private website) or altering an existing site or other online location associated with a tag. As part of the setup or alteration, the content management instructions 116 may in some examples cause the server 110 to provide a list of tag types identifying an intended use of the smart tag. The content management instructions 116 may cause the server 110 to receive a selection of a tag type from the requesting device.

In another embodiment, as part of the setup or alteration, the content management instructions 116 may provide a list of intended uses for the tag, receive a selected intended use, and assign a tag type based on the selected intended use. A tag type assigned to a tag may be changed at any time. A tag type may be associated with a template that includes pre-defined data fields and a pre-defined arrangement of data to be displayed at the site or other online location (e.g. TPW) encoded by the tag. Examples of templates may also include logic. For example, templates may be implemented using an XML template. Templates including logic may cause the server to perform conditional actions and/or information to take on a conditional layout or content based on information relating to a tag or a requester of the tag. For example, a template may include logic specifying which language to display the tag information in based on a location from which the tag was requested. In other examples, a template may include logic causing the server 110 to provide reminders or other information to a requester based on information in a record associated with the tag—for example, a reminder that charges may be incurred if a luggage tag is scanned where the luggage weight is greater than a threshold, e.g. 50 pounds. Templates may be stored, for example, in template storage 122 of FIG. 1 which may be implemented as any electronic storage (e.g. hard disk, RAM, ROM, flash) accessible to the server 110. The selected tag type may be stored in the tag database 120 and associated with the tag. The pre-defined data fields and pre-defined arrangement specified by templates in the template storage 122 may be configurable or altered based on requests received from the requesting device. Examples of tag types include, but are not limited to, a property tag type for providing contact information of an owner, an identification tag type for providing information corresponding to the owner or to a pet, a medical information smart tag for providing medical information corresponding to the owner, an information sharing smart tag for providing access to designated information, such as in a classroom, a social network tag type for providing information regarding social networks, an advertising tag type for providing advertising information, a product documentation tag type for providing documentation, maintenance records, and/or service information regarding an associated product (e.g., a product manual), a coupon tag type for conveying coupon information to consumers, a menu tag type for providing a menu to patrons, a location tag type for identifying historical information regarding a location, a business card tag type for conveying curriculum vitae, an event tag type for conveying information regarding an event (e.g., wedding, party, holiday event, etc.). In another embodiment, a new tag type (and corresponding template) may be provided by the requesting device to the server 110. The server 110 may save the new template in the tag database 120 and/or in the template storage. Access to the new tag type may be limited for selection by a user account associated with submission of the new tag type or may be crowdsourced and provided as an option to any user. The template associated with the new tag type may be submitted in a computer readable file, such as a word processing file or an extensible markup language file.

Further, the content management instructions 116 may cause the server 110 (e.g. the processing units 105) to prompt an owner via the requesting device to provide data and/or files including data to be displayed on the site or other online location pointed to by the tag (e.g. TPW). Tag data received by the server 110, such as owner account information, base tag information, workflow-specific information, authentication information, tag type, and campaign descriptions, may be stored in the tag database 120. Files, pictures, images, avatars, etc received by the server 110 may be stored in a file database 130. The data and/or files may include any of text, video, audio, interactive content, links to other sites, and/or any other electronic information. The content management instructions 116 may also cause the server 110 (e.g. processing units 105) to prompt the prospective owner via the requesting device to submit authentication information for access to edit content of the site or other online location pointed to by the tag. Owner authentication information may include a personal identification number (PIN), a password, or other security information. The owner authentication information may also be provided to the requesting device in a cookie or other identifying file stored on the requesting device.

Further, the content management instructions 116 may cause the server 110 (e.g. processing units 105) to add security for viewing all or a portion of data by the site or other online location pointed by the tag by prompting the prospective owner via the requesting device to enter authentication information for access to view all or a portion of content of the site (e.g. TPW). View authentication information may include a personal identification number (PIN), a password, a challenge-response test (e.g., a computer automated public Turing test to tell computers and humans apart (CAPTCHA) test), third party authentication over the phone, or other security protocols. View authentication information may be stored in the tag database 120.

Responsive to receiving a request from a requesting device, such as the owner device 140, or any device having read the tag, to view a site or other online location (e.g. tiny private website) associated with a tag, the content management instructions 116 may cause the server 110 (e.g. processing units 105) to retrieve the data associated with the site pointed to by the tag from the tag database 120. The request received from the requesting device may include a URL. The requesting device may receive the URL via an input device, such as a keyboard, a scanner, or a camera. If user authentication has been set up for access to a portion of or all of the information on the private tiny website, the content management instructions 116 may cause the server 110 (e.g.

processing units 105) to prompt the user for authentication information, such as a PIN, a password, or answer to challenge-response test. The content management instructions 116 may further cause the server 110 (e.g. processing units 105) to retrieve data from the requesting device. For example, the server 110 may retrieve an internet protocol (IP) address, an Internet browser type, a requesting device type, or other data relevant to the requesting device. In an embodiment, the server 110 may request location information from the requesting device, such as geo data, global positioning system data, cellular location data, or other forms of location data. The requesting device may solicit permission from a user to provide the location information responsive to receiving the request for the location information. The requesting device may further host an application that retrieves additional information corresponding to the user or the requesting device to provide to the server 110. The server 110 may use some or all of the data and the location information received from the requesting device as a basis for determining whether to provide, limit, or deny access to a site or other online location corresponding to the tag. For example, access to the site or other online location may be limited to requesting devices within a geographic region, or limited to a subset of requesting devices types, such as an iPhone.

The server 110 accordingly may provide a configurable interface in the form of an interface to a private tiny website that can be updated at any time by an owner of the tiny private website. The owner may be an exclusive owner, or may share ownership with others. The private tiny websites may be persistent, and can provide access to anyone anywhere in the world. The private tiny website may be easily adaptable to changing needs of an owner, including completely changing an intended use of a tag at any time. The TPWs may also include security features to prevent alteration or access by unauthorized parties. Retail tags may provide a mechanism to store customizable data related to a product that may be easily controlled and updated by a consumer. Further, a third party sponsor may customize activation or use of a retail tag in association with the third party sponsor, such as a branding campaign.

Accordingly, during operation of the system 100, a user of a computing device, e.g. the device 140, 150, or 190, may provide a request to the server 110 to register or modify a tag, such as the tag 146 or 194. The server 110 may require authentication in accordance with the authentication instructions 114 in some examples. On receipt of a request to register or modify a tag, the server 110 may provide the requesting device (e.g. by display on a website accessed by the requesting device) a plurality of options for tag types that may be selected. Each tag type may correspond with a template stored in the template storage 122. The templates may specify the type and arrangement of information to be provided at a site or other online location encoded by a tag. The requesting device may communicate to the server 110 a selection of a tag type to be used for the requested tag. The server 110 may accordingly request information from the requesting device corresponding to the type of information specified by the template corresponding to the selected template. For example, if a luggage tag type was selected, the template for luggage tag types may specify that an owner name, a home address, a destination address and a phone number should be collected. The server 110 may request this information from the requesting device e.g. by displaying an interactive form for completion by a user of the requesting device, including options for uploading photo or video content). The server 110 may receive the requested information from the requesting device and make that information available at the site or other online location encoded by the tag in a manner specified by the template. For example, the template for a pet tag may specify that the information is laid out in a particular manner at a website encoded by a tag. In this manner, generic tags may be obtained by a user and registered with the server 110 to easily take on any number of functions for data display at a site encoded by the tag. In some examples, no predetermined tag type may be selected and instead the site pointed to (e.g. encoded) by the tag may be completely configured by the owner of the tag to display any information in substantially any format selected by the owner of the tag and suitable for display at the site pointed to by the tag.

In another embodiment, content on a site or other online location may be accessed via an interactive voice response (IVR) system. For example, a user may call a designated telephone number via a telephone, and enter a unique portion of a URL associated with a tag. Data corresponding to the tag may be read over the telephone to a requesting party. Further, creation, activation, file loading, template selection, authentication, and any other function described in this application may be performed via an IVR system.

Figure 2:
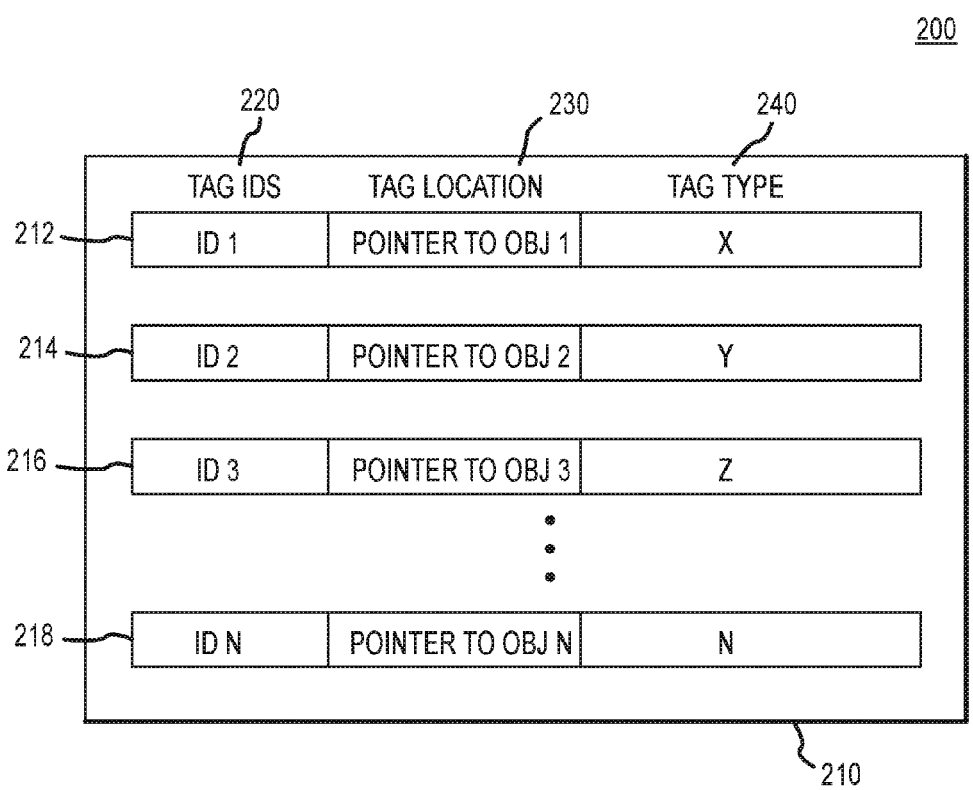
FIG. 2 is a block diagram of a particular illustrative embodiment of a tag database table.

Referring to FIG. 2, a table of a particular illustrative embodiment of a tag database is depicted and generally designated 200. The tag database 200 may be used to implement the tag database 120 of FIG. 1. The database table 210 indicates fields of a tag database and may include information stored in the tile database 130 of FIG. 1. The tag database generally may store data corresponding to each tag administered by a server.

The database table 210 may include up to N unique entries, with each entry associated with a corresponding tag. For example, the database table 210 is depicted with a first smart tag entry 212, a second smart tag entry 214, a third smart tag entry 216, and a Nth smart tag entry 218. The database table 210 may include up to N entries. Each entry includes one or more fields. In an embodiment, each entry includes a tag identification field 220, a tag file location field 230, and a tag type field 240. The tag identification field 220 may use by the software to uniquely identify each smart tag. The tag identification field 220 may be all of or a portion of a URL (e.g. a tiny private website URL) encoded in each smart tag, as described with reference to FIG. 1.

The tag file location field 230 may include a pointer to a unique object associated with a corresponding tag. The object may include a data provided by an owner of the corresponding tag that to be presented at an associated site or other Internet location pointed to by the tag. The data may include text, video, audio, a file, a software program, an image, and/or any other information that may be presented on the site.

The tag type field 240 may be assigned based on a selected intended use or a selected smart tag type received from the owner. The tag type field 240 may be associated with a template used to arrange the corresponding smart tag data on a site or other Internet location (e.g. TPW) associated with the tag identification field 220. Examples of types of smart tags were described above with reference to the description of FIG. 1. In some examples, the tag type field 240 may not be present and the tag type may not be explicitly stored in the database. The fields included and associated with a particular tag may instead be dictated by a template for that tag type, even if the tag type itself is not included in the table 210.

The database table 210 may contain more fields for each tag. For example, the database table 210 may include statistical information related to user access of the site associated with the tag. The statistical information may include a log of accesses (e.g., date and time), location information corresponding to accessing device, a total count of accesses for all users or a count of accesses by an each particular user, a length of time spent on the site, or any combination thereof. Further, each field of any record of the database table 210 may be changed at any time by an owner of the corresponding tag. For example, a record may be changed to identify a new intended use for a tag.

Figure 3:
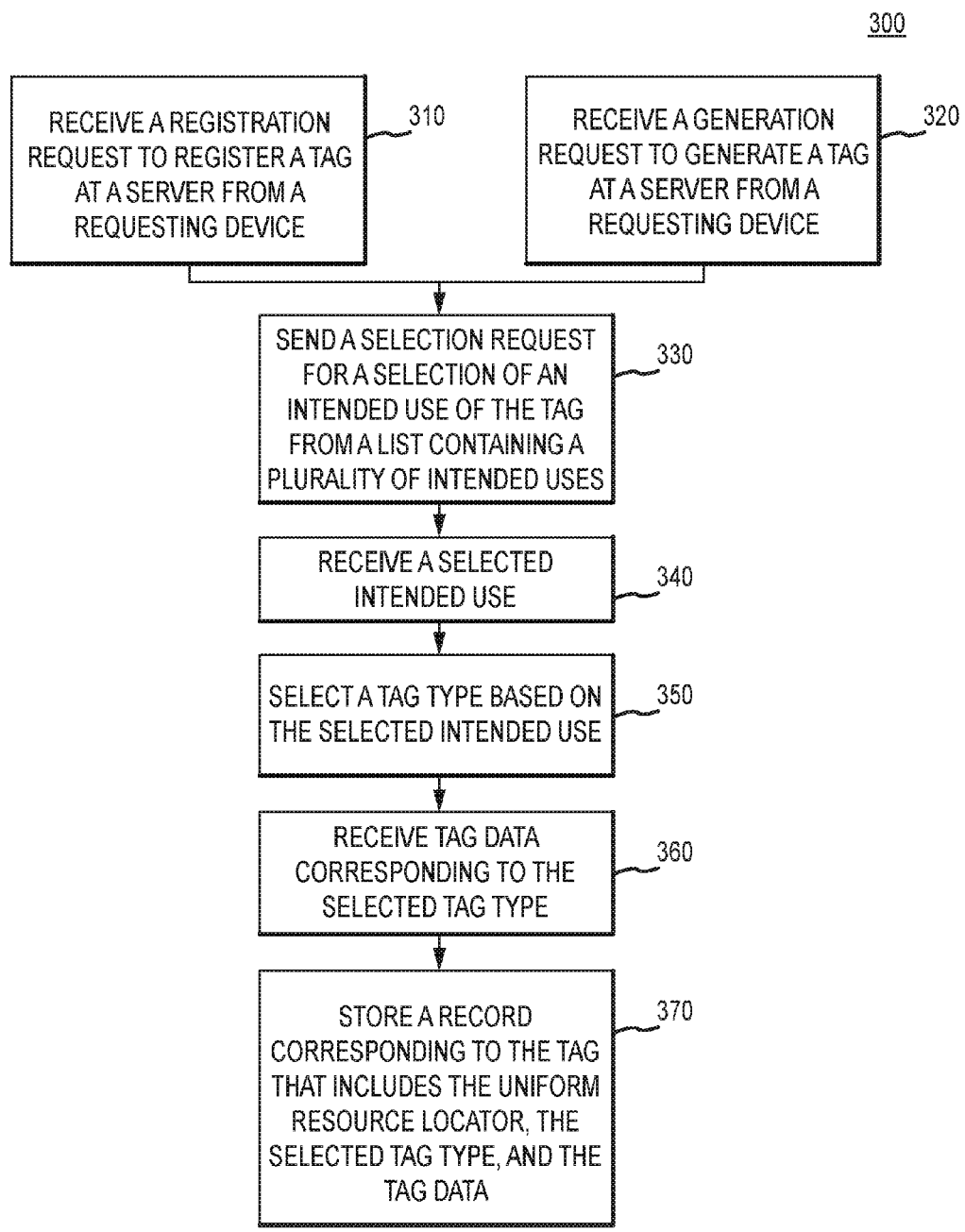
FIG. 3 is a flow diagram of a particular illustrative embodiment of a method of managing tag data.

Referring to FIG. 3, a flow diagram of a particular illustrative embodiment of a method of registering a tag and/or generating a tag is designated 300. The method 300 may be performed by the system 100 of FIG. 1.

The method 300 may include receiving a registration request to register a tag at a server from a requesting device, at step 310. Alternatively or in addition, the method may include receiving a generation request to generate a tag at a server from a requesting device, at step 320. The tag to be generated or registered may include a two-dimensional encoded image identifying a uniform resource locator. The server may include the database server 110 of FIG. 1. The requesting device may include the owner device 140 or the owner/user mobile device 190 of FIG. 1. The tag may include the first tag 146 and/or the second tag 194 of FIG. 1. The registration request may further include an activation code. The method may further include generating the tag by encoding a uniform resource locator in a computer readable image and providing the tag to the requesting device.

The method 300 may further include sending a selection request for selection of an intended use of the tag from a list containing a plurality of intended uses, at step 330. The method 300 may further include receiving a selected intended use of the smart tag, at step 340, and selecting a tag type based on the selected intended use, at step 350. In another embodiment, the selection request may be for selection of a tag type. The tag type may be selected from a plurality of predefined tag types, as explained with reference to FIG. 1.

The method may further include receiving tag data corresponding to the selected tag type, at step 360. The tag data may be the data displayed on a site or other Internet location (e.g. TPW) associated with the URL encoded by the tag. The tag data may include text, a file, video content, audio content, interactive content, images, or any combination thereof. The tag data content may be updated at any time, including adding new data, or modifying or removing existing data.

The method may further include storing a record corresponding to the tag, the record including the uniform resource locator, the selected tag type, and the tag data, at step 370. The record may be stored in the file database 130 of FIG. 1. The record may be stored in a format corresponding to the database table 210 of FIG. 2.

After storing the record, the method may include receiving a change request to select a different intended use of the tag. The method may include selecting a second tag type based on the different intended use, and updating the record to remove the tag type and add the second tag type. The method may include removing data associated with the first tag type from the record and adding data associated with the second tag type to the record.

During registration or generation of a tag, the method may include generating authentication information corresponding to the tag, and including the authentication information in the record. The authentication information may be supplied by the owner or the corresponding tag. Generating the authentication information may include providing the authentication information to the requesting device, such as an Internet cookie. In another embodiment, generating the authentication information may include receiving authentication information from the requesting device, such as a personal identification number and/or a password.

The method 300 may be implemented by one or more processing units such as a central processing unit (CPU), a digital signal processor (DSP), a controller, another hardware device, a firmware device, or any combination thereof. As an example, the processing unit(s) 105 of the database server 110 of FIG. 1.

Figure 4:
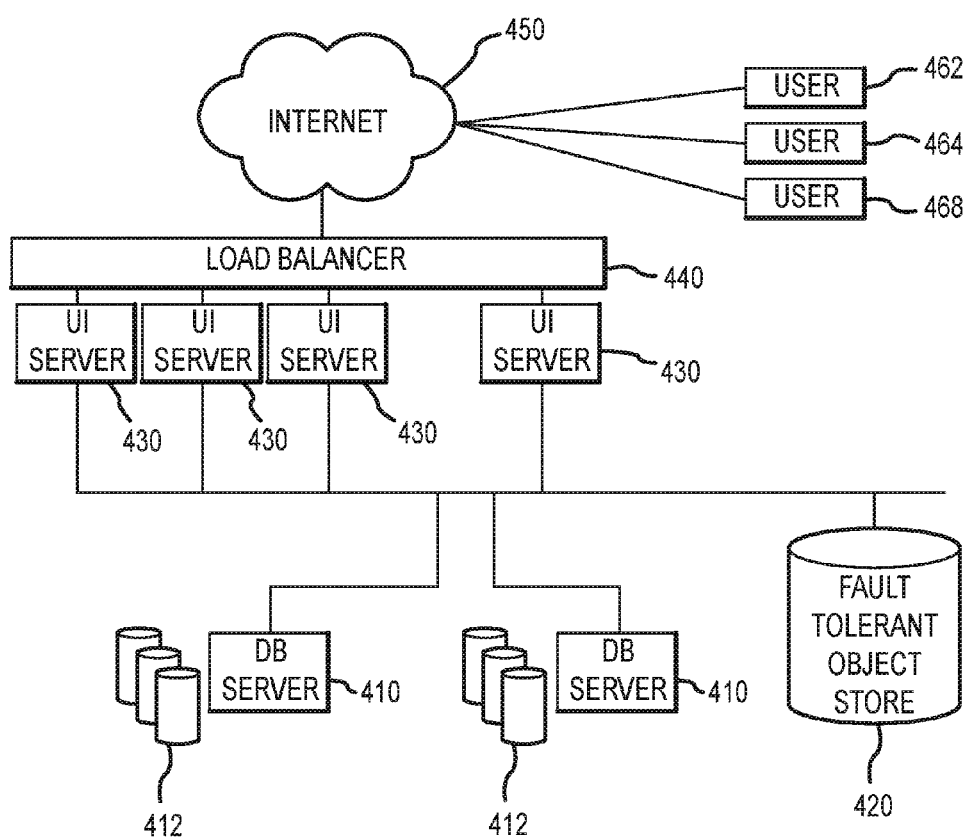
FIG. 4 is block diagram of a particular illustrative embodiment of a system including a tag access system.

Systems according to examples of the present invention are quite flexible in their architecture. Examples of the present invention may, for example, be implemented in a cloud-based system where server resources may be dynamically assigned to perform functions of examples of the present invention to dynamically support a desired number of tags and sites pointed to by those tags. Referring to FIG. 4, a block diagram of a system 400 in accordance with an embodiment of the present invention includes a plurality of user interface servers 430 accessible to a plurality of users 462, 464, and 468 via the Internet 450. Selection of a particular user interface (UI) server 430 to communicate with a particular user device 462, 464, or 468 may be controlled by a load balancer 440. Corresponding to received requests from user devices 462, 464, and 468, an assigned UI server 430 may communicate a tag database 412 via a server 410 and a fault tolerant object store database 420 to retrieve tag data. Each UI server 430 and each database server 410 may include all or a portion of the database server 110 of FIG. 1. The tag database 412 may include the smart tag database 120 of FIG. 1. The fault tolerant object store database 420 may include the file database 130 of FIG. 1 and/or the tag database 120 of FIG. 1.

The load balancer 440 may accept tag access requests and user session requests. The load balancer 440 may include a firewall. The load balancing and firewall of load balancer 440 may allow on-demand instantiation of one or more of the UI servers 430, as required by demand of tag owners and/or requests to access the site pointed to by the tag by other users of the system 400. Each of the UI servers 430 may perform similar functions. Accordingly, each of the UI servers 430 may be configured (e.g. programmed) to handle tag look-up requests received from user devices 462, 464, and 468. For example, an assigned UI server 430 may retrieve data from the fault tolerant object store database 420 and the tag database 412 responsive to a received user request corresponding to a tag. Further, each UI server 430 may manage assigned owner sessions for modifying data associated with a tag, including uploading of new data from a user device. The load balancer 440 may balance loads on each of the UI servers 430 by assigning one of the UI servers 430 to respond to each particular received request.

Each database server 410 may manage a corresponding tag database 412. In an embodiment, each database server 410 manages the corresponding tag database 412 using relational database appliances. Each database server 410 and corresponding tag database 412 may be configured with multiple zone availability to increase reliability. Each tag database 412 may store user account information, base tag information, workflow-specific tag information, tag access information, tag template information, and campaign descriptors. In an embodiment, each tag database 412 contains a portion of an entire tag database.

For each tag, the fault tolerant object store database 420 may store associated uploaded files, such as images, pictures, avatars, and file object uploaded by a user. The fault tolerant object store database 420 may use triple redundant storage. Which may increase reliability in one example.

Figure 5:
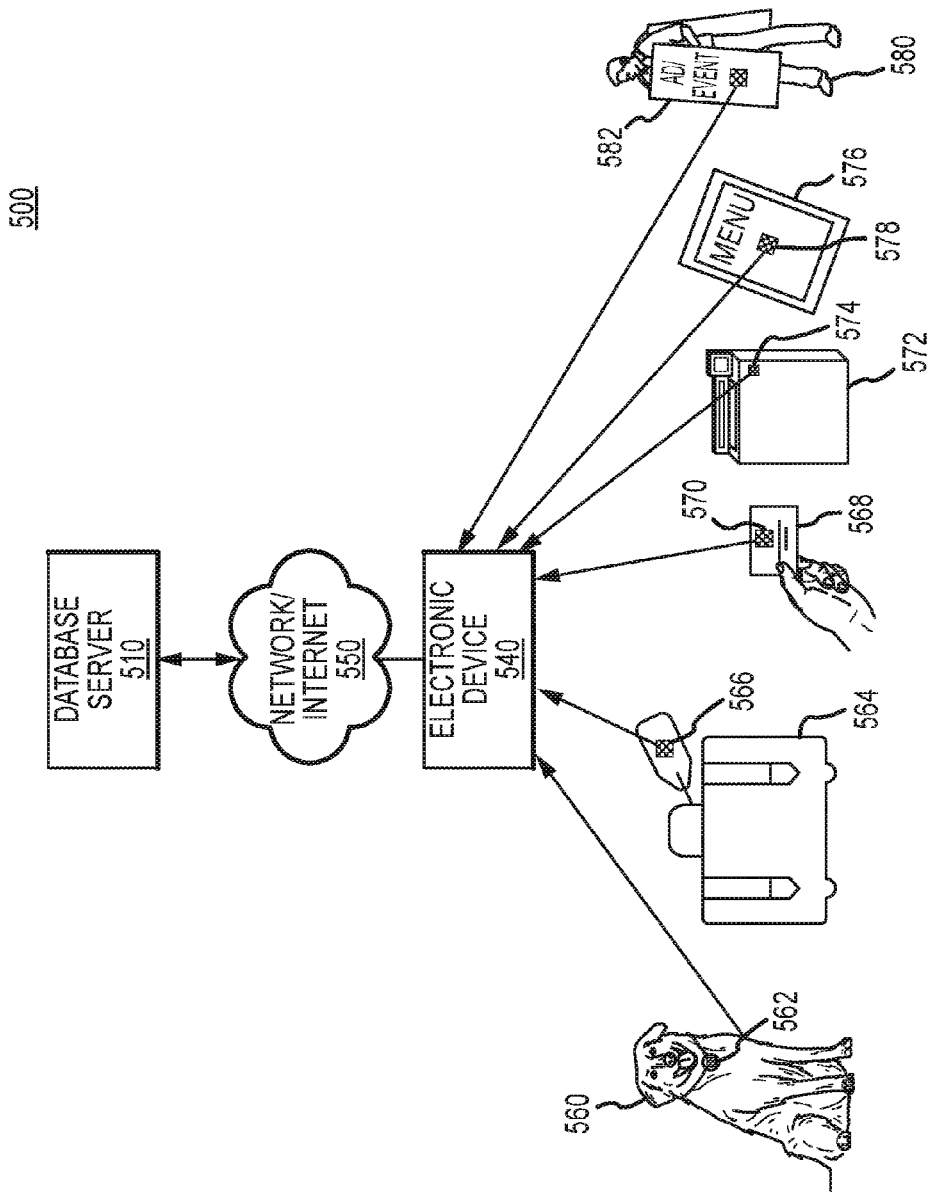
FIG. 5 is block diagram of a particular illustrative embodiment of a system including multiple tag types.

Embodiments of the present invention may accordingly allow for tags to be flexibly assigned to substantially any content made available at a site pointed to by the tag. A given tag may not be irreversibly dedicated to a particular purpose. An owner of the tag may control the information available at the site pointed to by the tag, which may generally be any information that may be served by a website and may be information of a type and arrangement dictated by a tag template in some examples. Referring to FIG. 5, a block diagram of a particular illustrative embodiment of a system including multiple tag types is disclosed and generally designated 500. The system 500 may provide a site or other Internet location (e.g. TPW) for each tag, where each tag has a configurable use. The system 500 may include a database server 510 that may receive information from and provides information to an electronic device 540. The information provided by and the information received at the database server 510 may correspond to a respective tag, such as a pet tag 562 of a pet 560, a luggage tag 566 of a luggage 564, a business card tag 570 of a business card 568, an appliance/electronic equipment tag 574 of an appliance/electronic equipment 572, a menu tag 578 of a menu 576 and/or an advertisement/event/coupon tag 582 of an advertisement/event/coupon 580. The database server 510 may include the database server 110 of FIG. 1. The electronic device 540 may include the owner device 140, the user device 150, and/or the owner/user mobile device 190 of FIG. 1.

As explained with reference to FIG. 1, the electronic device 540 may scan an image of a smart tag, decode the scanned image to obtain a URL, and send a request, via the network/Internet 550, to access the URL. The database server 510 may facilitate management of the data associated with the tag, including storing new data received, controlling access to the data, etc.

In exemplary embodiments illustrated in FIG. 5, each tag may be configured for a distinct use. An indicated use of a smart tag may be altered at any time. For example, the pet tag 562 may be removed from the pet 560, moved to replace the luggage tag 566 of the luggage 564. In order to facilitate a change of information available at the site pointed to by the tag, an owner of a smart tag, via an electronic device 540, may communicate the change to the database server 510, including supplying new data to be associated with the tag.

Tags, such as the tags shown in FIG. 5, may be sold or otherwise provided to a tag owner who may then elect how the tags are to be used, as has been described herein. Because the tags do not have a predetermined use, they may be generally sold to a broader audience in some examples and may facilitate tagging by retail organizations. For example, a particular shoe store may procure a number of tags and utilize the tags to tag individual merchandise items. The tags may each encode a URL for a website whose content may be controlled by the tag owner, such as the shoe store, and provide information and a look and feel associated with that owner.

Those of ordinary skill would further appreciate that the various illustrative logical blocks, configurations, modules, circuits, and algorithm steps described in connection with the embodiments disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A system, comprising:
a server configured to generate a tag responsive to receiving a request from a requesting device, the tag encoded with a uniform resource locator, the server further configured to associate a tag type of a plurality of smart tag types with the tag, the tag type indicating an intended use of the tag, the server further configured to cause one or more processing units to update the tag to assign a new tag type responsive to receiving a request from the requesting device of a new indicated use; and
a memory configured to store data corresponding to the tag; the uniform resource locator, and data for retrieval at the uniform resource locator in accordance with the tag type.

2. The system of claim 1, wherein the memory comprises a tag database, wherein the data is stored in the database.

3. The system of claim 2, wherein the memory further comprises template storage, wherein the template storage includes templates for each of the plurality of tag types.

4. The system of claim 1, wherein the server is further configured to change the tag type based on receiving a type change request from the requesting device.

5. The system of claim 1, wherein the server is coupled to a network, wherein the request is received via the network.

6. The system of claim 1, wherein the server is further configured to associate tag data with the tag, the tag data provided by the requesting device, the tag data corresponding to a template associated with the tag type.

7. The system of claim 6, wherein the tag data includes any of a video content, audio content, a software program, a file, or any combination thereof.

8. A non-transitory computer readable medium including computer executable instructions that, when executed by one or more processing units, cause the one or more processing units to:
receive a generation request to generate a tag from a requesting device;
generate the tag by encoding a uniform resource locator in a computer readable image;
provide the computer readable image to the requesting device;
receive an indication of an intended use of the tag;
assign a tag type based on the indicated intended use;
receive tag data corresponding to the tag type; and
store a record corresponding to the tag, the record including the tag type, the tag data, and the uniform resource locator.

9. The non-transitory computer readable medium of claim 8, further comprising instructions, that, when executed by the one or more processing units, cause the one or more processing units to:
   arrange the tag data according to the tag template; and
   provide the arranged tag data to the requesting device, the arranged data used by the requesting device to view a site corresponding to the uniform resource locator.

10. The non-transitory computer readable medium of claim 8, further comprising instructions, that, when executed by the one or more processing units, cause the one or more processing units to:
    assign viewer authentication information to the tag; and
    limit access to at least a portion of the arranged data prior to receiving authentication information from the requesting device.

11. The non-transitory computer readable medium of claim 8, further comprising instructions, that, when executed by the one or more processing units, cause the one or more processing units to update the record to assign a new tag type based on receiving a new indicated use from the requesting device.

12. The non-transitory computer readable medium of claim 8, the tag type is selected from a list consisting of a property tag type, an identification tag type, a medical information tag type, an information sharing tag type, a social network tag type, an advertising tag type, a product documentation tag type, a coupon tag type, a menu tag type, a location tag type, a business card tag type, and an event tag type.

13. An apparatus comprising:
    an object; and
    a tag affixed to the object, the tag comprising an image including a quick response code, the quick response code identifying a uniform resource locator, the uniform resource locator corresponding to an Internet site, the Internet site including data, wherein the data is arranged on the Internet site according to a first tag type when the first tag type is associated with the tag, and wherein the data is arranged on the Internet site according to a second tag type when the second tag type is associated with the tag.

\* \* \* \* \*